Patented Sept. 3, 1940

2,213,530

UNITED STATES PATENT OFFICE 2,213,530

FLUID TREATING COMPOSITION AND METHOD OF MAKING SAME

Bruno Montero, Los Angeles, Calif., assignor to Investo Company, Baldwin Park, Calif., a corporation of Nevada No Drawing. Application October 27, 1939, Serial No. 301,633

5 Claims. (Cl. 23—113)

This invention relates to a chemical composition of matter for treating fluids and the method of making same. This composition not only removes lime from the water but also separates therefrom the magnesium it may contain.

The present application is a continuation in part of my earlier application entitled "Water softening composition and method of making same," Serial No. 154,395, filed July 19, 1937.

The invention pertains to a composition of a granular character which does not dissolve in water but has the property of attracting the molecules of calcium and magnesium from the body of water brought into contact therewith.

This product is an industrial product. The materials used are obtainable on the market in large amounts and at low cost.

Furthermore, as all products used are standard, if preferred, all proportions may be estimated by volume and not by weight, and all operations performed at ordinary temperatures without artificially heating or cooling. Also as this product is industrial and not a "drug," such small variations as might occur in particle size and amount of packing, etc., do not materially alter the quality of the final product.

The filtering material provided by this invention acts effectively in filtering and bleaching both vegetable and mineral oils. It can also be used, by filtration, to remove various impurities from acids.

It is an important object of the invention to provide for more rapid and economical production of an efficient water softening composition of matter, by avoiding the necessity of taking the time hitherto required to dry water softening compositions before they are in a condition for use. Although water softening compositions in some respects similar to that to which this invention pertains have hitherto been produced, it has, thus far, been found necessary to dry them slowly thereby converting them from jellies of the kind that cannot be broken up into granules which maintain their separate character during use, into sufficiently dry, granular products to be usable as filtering substances and to soften water. This invention provides for the more rapid and economical manufacture of the composition owing to it being ready for use immediately after the ingredients thereof have been combined with each other. The relative amount of water required to make this composition is very small.

Another object of the invention is to produce a water softening and fluid filtering product which sulphuric, hydrochloric and carbonic acids will not injure.

The following are the steps to be followed, and quantities by avoirdupois weight (except the water, which is measured) of the ingredients used in making the composition of matter to which this invention pertains:

In two liquid ounces of water (any water suitable for domestic use) dissolve one ounce and 72 grains of ordinary undehydrated, granular commercial aluminum sulfate, preferably having the formula $(Al_2(SO_4)_3.18H_2O)$; and 175 grains of sodium chloride (NaCl), preferably in a finely granular condition (dairy salt). Into the liquid solution thus produced pour five ounces and 335 grains of sodium silicate, forty degrees Beaumé density, and consisting of $Na_2O$ 8.85%, $SiO_2$ 28.5%, $H_2O$ 62.65%. By stirring in well this last ingredient an immediate coagulation is caused to take place, and there is at once produced a uniform product consisting of a granular precipitate of insoluble grains wherein the grains cluster together in a lumpy mass, a small quantity of liquid that can be decanted off remaining. After decanting off said liquid the granular part is washed by pouring water thereonto, stirring and decanting. Or a vat having a bottom outlet covered by a fine mesh sieve may be used for this flushing with water and draining off operation. When the ingredients have been properly mixed, one complete washing will suffice.

After the product has thus been washed it is passed through a sieve, desirably of a twenty (20) mesh, this being preferably done while the sieve and the product supported thereby are maintained submerged under water. The size of the grains thus produced will be determined by the size of the meshes of the sieve through which the product is passed. The grains thus produced are of a highly porous character, are insoluble in water, and are of a very desirable quality for water filtering and softening. The quick formation of a uniform product is believed to be due to the fact that into a more highly concentrated aluminum sulfate solution than has been hitherto used for a similar purpose is poured and quickly mixed the sodium silicate. The mixing operation is continued until a uniform hardness of the grains is produced. When, for example a pound (avoirdupois) or less of the ingredients are mixed together the mixing operation can be completed within five minutes. Actual tests have shown that this product can be used for many months under usual domestic city water pressures without any lessening of its efficiency or diminishing of its volume, for water filtering and purifying.

By the granular condition of the precipitate specified in the appended claims is meant a condition wherein the product is reduced to particles the cross-sectional dimensions of which are restricted to a size that will adapt it for use in a body of material through which the liquid to be treated is caused to percolate, said granules being of a non-sticky and non-slimy character so that they do not adhere to each other but which, when formed into a filtering body and as such subjected to ordinary city water pressure for many months will still afford interstices between them through which the water being filtered may percolate.

The size of the granules into which the product will be broken up by passing it through a sieve, or otherwise, will be determined by the kind of fluid to be treated. It is desirable to use small granules, where practicable, because the smaller the granules the greater the surface area presented to the fluid being treated.

The product produced by this process cannot be destroyed by sulphuric, hydrochloric or carbonic acids in any degree of concentration. For example, this product can be immersed in a solution of fifty per cent water and fifty per cent of sulphuric acid ($H_2SO_4$) for many hours without disqualifying said product for water softening and filtering purposes.

I claim:

1. A method of making an artificial base exchanging composition of matter which consists in dissolving in approximately every two liquid ounces of water used approximately one ounce and 72 grains (avoirdupois) aluminum sulfate, ($Al_2(SO_4)_3.18H_2O$); adding to this solution 175 grains chloride of sodium (NaCl); and then mixing into this solution five ounces and 335 grains (avoirdupois) of sodium silicate, 40 degrees Beaumé density and consisting of $Na_2O$ 8.85%, $SiO_2$ 28.5%, $H_2O$ 62.65%; then passing the resulting precipitate without drying through a sieve of approximately a twenty mesh.

2. The subject matter of claim 1 and, washing said precipitate in commercially pure water.

3. The subject matter of claim 1 and, washing said precipitate in commercially pure water before passing it through said sieve.

4. The subject matter of claim 1 and, washing said precipitate in water after passing it through said sieve.

5. A method of making an artificial base exchanging composition of matter which consists in dissolving in approximately every two liquid ounces of water used approximately one ounce and 72 grains (avoirdupois) aluminum sulfate, ($Al_2(SO_4)_3.18H_2O$); adding to this solution 175 grains chloride of sodium (NaCl); and then mixing into the resulting solution five ounces and 335 grains (avoirdupois) of sodium silicate, 40 degrees Beaumé density and consisting of $Na_2O$ 8.85%, $SiO_2$ 28.5%, $H_2O$ 62.65%; then reducing the resulting precipitate without drying into a granular condition.

BRUNO MONTERO.